United States Patent
Shah et al.

(10) Patent No.: US 11,533,345 B2
(45) Date of Patent: Dec. 20, 2022

(54) METHOD AND APPARATUS FOR PROVIDING GENERIC FRAMEWORK TO MANAGE CUSTOM SUBSCRIPTION OVER SIP

(71) Applicant: Samsung Electronics Co., Ltd., Suwon-si (KR)

(72) Inventors: Sapan Pramodkumar Shah, Bangalore (IN); Basavaraj Jayawant Pattan, Bangalore (IN); Nishant Gupta, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/212,980

(22) Filed: Mar. 25, 2021

(65) Prior Publication Data

US 2021/0306382 A1    Sep. 30, 2021

(30) Foreign Application Priority Data

Mar. 27, 2020  (IN) .............................. 202041013545
Mar. 3, 2021   (IN) .............................. 202041013545

(51) Int. Cl.
*H04L 65/1104*     (2022.01)
*H04W 8/18*        (2009.01)

(52) U.S. Cl.
CPC ........... *H04L 65/1104* (2022.05); *H04W 8/18* (2013.01)

(58) Field of Classification Search
CPC ..... H04L 67/16; H04L 12/2807; H04L 63/08; H04L 12/2803; H04L 29/06027;

(Continued)

(56) References Cited

U.S. PATENT DOCUMENTS

2004/0095938 A1   5/2004  Ryu
2006/0067244 A1*  3/2006  Sekaran .................. H04L 67/14
                                                              370/252

(Continued)

FOREIGN PATENT DOCUMENTS

WO    03/107621 A1    12/2003
WO   2009012724 A1     1/2009

OTHER PUBLICATIONS

International Search Report and Written Opinion of the International Searching Authority in connection with International Application No. PCT/KR2021/003781 dated Jul. 7, 2021, 7 pages.

(Continued)

*Primary Examiner* — Djenane M Bayard

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Accordingly, the embodiments herein disclose a method for providing a generic framework to manage a custom subscription over a SIP. The method includes sending at least one request with a plurality of parameters to a server SIP node (200) for any type of data over a SIP regardless of an event package is available or not. The custom subscription is managed by one of creating the custom subscription, modifying the custom subscription, deleting the custom subscription, notifying the custom subscription, and terminating the custom subscription using the plurality of parameters. Further, the method includes providing a subscription for a location management service associated with the server SIP node (200) over the SIP regardless of the event package is available or not. The server SIP node (200) allows a client SIP node (100) to manage a location information using the plurality of parameters.

16 Claims, 12 Drawing Sheets

(58) Field of Classification Search
CPC ......... H04L 12/14; H04L 12/66; H04L 61/35; H04L 63/065; H04L 63/0823; H04L 63/102; H04L 65/1016; H04L 65/1026; H04L 65/1036; H04L 65/1096; H04L 65/40; H04L 65/1063; H04L 65/1104; H04L 65/1101; H04L 67/54; G06F 16/64; G06F 16/68; G06F 16/1847
See application file for complete search history.

(56) References Cited

U.S. PATENT DOCUMENTS

| | | | |
|---|---|---|---|
| 2007/0153770 A1* | 7/2007 | Goyal | H04L 29/06027 370/352 |
| 2007/0299979 A1 | 12/2007 | Houri et al. | |
| 2008/0043723 A1* | 2/2008 | Lindgren | H04L 12/66 370/352 |
| 2008/0113669 A1 | 5/2008 | Shi | |
| 2009/0300189 A1* | 12/2009 | Takeda | H04L 67/02 709/227 |
| 2012/0110208 A1* | 5/2012 | Abrahams | H04L 65/105 709/245 |
| 2016/0255490 A1 | 9/2016 | Mufti et al. | |

OTHER PUBLICATIONS

"3rd Generation Partnership Project; Technical Specification Group Core Network and Terminals; Location Management—Service Enabler Architecture Layer for Verticals (SEAL); Protocol specification; (Release 16)", 3GPP TS 24.545 V16.1.0 (Jun. 2020), 38 pages.

Intellectual Property India, "Examination report under sections 12 &13 of the Patents Act" dated Feb. 1, 2022, in connection with Indian Patent Application No. 202041013545, 7 pages.

* cited by examiner

Message formats 201

| Bits | | | | | | | | Message types |
|---|---|---|---|---|---|---|---|---|
| 8 | 7 | 6 | 5 | 4 | 3 | 2 | 1 | |
| 0 | 0 | 0 | 0 | 0 | 0 | 0 | 1 | Create location event subscribe request message |
| 0 | 0 | 0 | 0 | 0 | 0 | 1 | 0 | Create location event subscribe response message |
| 0 | 0 | 0 | 0 | 0 | 0 | 1 | 1 | Modify location event subscribe request message |
| 0 | 0 | 0 | 0 | 0 | 1 | 0 | 0 | Modify location event subscribe response message |
| 0 | 0 | 0 | 0 | 0 | 1 | 0 | 1 | Delete location event subscribe request message |
| 0 | 0 | 0 | 0 | 0 | 1 | 1 | 1 | Delete location event subscribe response message |
| 0 | 0 | 0 | 0 | 1 | 0 | 0 | 0 | Terminate location event subscribe message |
| 0 | 0 | 0 | 0 | 1 | 0 | 0 | 1 | Location event notify message |
| All other values are reserved. | | | | | | | | |

202

| 8 | 7 | 6 | 5 | 4 | 3 | 2 | 1 | |
|---|---|---|---|---|---|---|---|---|
| Expiry Time value | | | | | | | | octet 1<br>octet 3 |

203

| 8 | 7 | 6 | 5 | 4 | 3 | 2 | 1 | |
|---|---|---|---|---|---|---|---|---|
| Time Interval value | | | | | | | | octet 1<br>octet 2 |

204

| 8 | 7 | 6 | 5 | 4 | 3 | 2 | 1 | |
|---|---|---|---|---|---|---|---|---|
| Subscription Identifier value | | | | | | | | octet 1<br>octet 4 |

205

| 8 | 7 | 6 | 5 | 4 | 3 | 2 | 1 | |
|---|---|---|---|---|---|---|---|---|
| Number of User IEI | | | | | | | | octet 1 |
| Number of User | | | | | | | | octet 2 |

| 8 | 7 | 6 | 5 | 4 | 3 | 2 | 1 | |
|---|---|---|---|---|---|---|---|---|
| \multicolumn{8}{c|}{User Identity IEI} | octet 1 |
| \multicolumn{8}{c|}{Length of VAL user ID contents} | octet 2 |
| | | | | | | | | octet 3 |
| \multicolumn{8}{c|}{VAL user ID contents} | octet 4 |
| | | | | | | | | octet 5 |
| | | | | | | | | |
| | | | | | | | | octet n |

207

| 8 | 7 | 6 | 5 | 4 | 3 | 2 | 1 | |
|---|---|---|---|---|---|---|---|---|
| \multicolumn{8}{c|}{VAL user number} | octet 4 |
| \multicolumn{8}{c|}{VAL user ID value} | octet 5 |
| | | | | | | | | |
| | | | | | | | | octet n |

208

| 8 | 7 | 6 | 5 | 4 | 3 | 2 | 1 | |
|---|---|---|---|---|---|---|---|---|
| \multicolumn{8}{c|}{User Location Data IEI} | octet 1 |
| \multicolumn{8}{c|}{Length of User location contents} | octet 2 |
| | | | | | | | | octet 3 |
| \multicolumn{8}{c|}{VAL user number} | octet 4 |
| \multicolumn{8}{c|}{User location contents} | octet 5 |
| | | | | | | | | |
| | | | | | | | | octet n |

FIG.2CB

METHOD AND APPARATUS FOR PROVIDING GENERIC FRAMEWORK TO MANAGE CUSTOM SUBSCRIPTION OVER SIP

CROSS-REFERENCE TO RELATED APPLICATIONS

This application is based on and claims priority under 35 U.S.C. § 119 to Indian Provisional Patent Application No. 202041013545 filed on Mar. 27, 2020, and Indian Complete Patent Application No. 202041013545 filed on Mar. 3, 2021, the disclosures of which are herein incorporated by reference in their entirety.

BACKGROUND

1. Field

The present disclosure relates to a session initiation protocol (SIP). The present disclosure is specifically related to a method and SIP nodes for providing a generic framework to manage a custom subscription over the SIP.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In an existing SIP-based subscribe mechanism, a user requires an event package in a subscribe request to subscribe to any event data (e.g., conference data, location data, sensor data, etc.) from a server. According to RFC 3265, the user (subscriber) may have exactly one "Event" header (event package) in the subscribe request, indicating which event data or event data class the user wants to subscribe to. FIG. 1 is a sequence diagram illustrating an existing SIP-based subscribe mechanism, according to a prior art disclosed herein. At steps 1-2, a client SIP node (10) sends the SIP SUBSCRIBE request to subscribe for specific event data from a server SIP node (20). The subscribe request comprises the event package (event report request). At steps 3-5, a specific event occurs at the server SIP node (20), and the server SIP node (20) sends a notification SIP NOTIFY message (event report) associated with the subscribed specific event data to the client SIP node (10).

In addition, there are limited event packages available as per the internet assigned numbers authority (IANA) and there are several servers available in a world which has different types of data available (such as location data, sensor data, etc.) but does not have IANA-registered event packages associated with them. For example, there is no event package available if any authorized user wants to subscribe to another user's device location. Similarly, there is no event package available for any authorized user to subscribe to temperature sensor's data. Also, defining and standardizing the new event package requires an enormous amount of time.

In another example, the service enabler architecture layer (SEAL) provides services that can be used by multiple vertical applications. One such service provided by the SEAL is a location management service, which allows a vertical application layer (VAL) server to manage a location information of VAL users. The location management service allows the VAL server to subscribe to the location information of the VAL users. But there is no standard SIP event package available that can be used with the SIP-based subscribe mechanism.

In general, the user (e.g., client SIP node (10), VAL server, user equipment (UE)) may require the event package in the subscribe request to subscribe to any event data from the server (e.g., server SIP node (20), SEAL server). There is no mechanism through which the user can subscribe to any type of data over the SIP regardless of the event package is available or not. Thus, it is desired to address the above-mentioned shortcomings or at least provide a useful alternative.

SUMMARY

The principal object of the embodiments herein is to provide a generic framework to manage a custom subscription by sending at least one request with a plurality of parameters to a server for any type of data over a SIP regardless of an event package is available or not. The custom subscription is managed by one of creating the custom subscription, modifying the custom subscription, deleting the custom subscription, notifying the custom subscription, and terminating the custom subscription using the plurality of parameters.

Another object of the embodiment herein is to provide a subscription for a location management service associated with a SEAL location management server (SLM-S) over the SIP regardless of the event package is available or not. The SLM-S allows a VAL server to manage a location information of VAL users using the plurality of parameters.

Accordingly, the embodiments herein disclose a method for providing a generic framework to manage a custom subscription over a SIP. The method includes receiving, by a server SIP node, a SIP message from a client SIP node to create the custom subscription over the SIP for custom information, where the SIP message comprises a create custom subscription request message, where the create custom subscription request message comprises a plurality of parameters. Further, the method includes sending, by the server SIP node, a response message to the client SIP node in response to receiving the SIP message. Further, the method includes generating, by the server SIP node, a unique subscription identifier in response to receiving the SIP message for creating the custom subscription over the SIP for the custom information and starting a subscription expiry timer. Further, the method includes creating, by the server SIP node, the subscription for the custom information based on the subscription context from the received SIP message. Further, the method includes assigning, by the server SIP node, the unique subscription identifier to the created custom subscription for the custom information based on the subscription context from the received SIP message. Further, the method includes sending, by the server SIP node, a SIP message to the client SIP node, where the SIP message comprises a create custom subscription response message.

In an embodiment, the plurality of parameters comprises an expiry time, a time interval and other subscription related parameters.

In an embodiment, the create custom subscription response message comprises the expiry time, the unique subscription identifier and other subscription related parameter.

In an embodiment, the method further includes configuring, by the client SIP node, value of the expiry time, where the expiry time is a time till when the client SIP node wants to receive a current status and later notifications of the custom subscription. Further, the method includes configuring, by the client SIP node, value of the time interval, where the time interval is a period between two consecutive notifications as indicated by the client SIP node. Further, the method includes configuring, by the client SIP node, other required parameters as per subscription data type.

In an embodiment, the method further includes re-configuring, by the server SIP node, the expiry time, where value of the expiry time as present in the received SIP message is not acceptable by the server SIP node, the server SIP node changes value of the expiry time to a different value than the present in the received SIP message. Further, the method includes initiating, by the server SIP node, the subscription expiry timer and a notification interval timer based on the configuration of the server SIP node.

In an embodiment, the method further includes receiving, by the server SIP node, a SIP message from the client SIP node to modify the created custom subscription over the SIP for the custom information, where the SIP message comprises a modify custom subscription request message, where the modify custom subscription request message comprises the unique subscription identifier and updated the plurality of parameters. Further, the method includes sending, by the server SIP node, a response message to the client SIP node in response to receiving the SIP message. Further, the method includes configuring, by the server SIP node, the plurality of parameters based on the updated plurality of parameters and restarting the expiry timer. Further, the method includes modifying, by the server SIP node, the created custom subscription over the SIP for the custom information based on the received SIP message from the client SIP node and sending a SIP message to the client SIP node, where the SIP message comprises a modify custom subscription response message.

In an embodiment, the modify custom subscription response message comprises an updated expiry time, the unique subscription identifier, and other subscription related parameters.

In an embodiment, the method further includes receiving, by the server SIP node, a SIP message from the client SIP node to delete the created custom subscription over the SIP for the custom information, where the SIP message comprises a delete custom subscription request message, where the delete custom subscription request message comprises the unique subscription identifier and an expiry time, where value of the expiry time is zero. Further, the method includes sending, by the server SIP node, a response message to the client SIP node in response to receiving the SIP message. Further, the method includes deleting, by the server SIP node, the stored custom subscription over the SIP for the custom information and the plurality of parameters associated with the received SIP message from the client SIP node. Further, the method includes sending, by the server SIP node (200), a SIP message to the client SIP node, where the SIP message comprises a delete custom subscription response message and terminates the expiry time and the time interval, where the delete custom subscription response message comprises the unique subscription identifier.

In an embodiment, the method further includes sending, by the server SIP node, a SIP message to the client SIP node to notify the information, where the SIP message comprises a custom subscription notify message, where the custom subscription notify message comprises the unique subscription identifier and data to be notified.

In an embodiment, the client SIP node stores the data and shares the data with at least one user when the client SIP node receives the SIP message from the server SIP node.

In an embodiment, the method further includes sending, by the server SIP node, a SIP message to the client SIP node to terminate the created custom subscription over the SIP for the custom information, where the SIP message comprises a terminate custom subscription message, where the terminate custom subscription message comprises the unique subscription identifier.

In an embodiment, the client SIP node deletes the created custom subscription, terminates the subscription expiry timer and the notification interval timer when the client SIP node receives the SIP message from the server SIP node.

Accordingly, the embodiments herein disclose a method for providing a generic framework to manage a custom subscription over a SIP. The method includes receiving, by a server SIP node, a SIP message from a client SIP node to create the subscription over the SIP for location information of multiple users, the SIP message comprises a create location event subscribe request message, the create location event subscribe request message comprises a plurality of parameters. Further, the method includes sending, by the server SIP node, a response message to the client SIP node in response to receiving the SIP message. Further, the method includes storing, by the server SIP node, the received plurality of parameters to create a subscription context. Further, the method includes generating, by the server SIP node, a unique subscription identifier in response to receiving the SIP message for creating the subscription over the SIP for the location information and starting a subscription expiry timer. Further, the method includes creating, by the server SIP node, the custom subscription for the location information of the multiple users based on the subscription context by sending a SIP message to the client SIP node, the SIP message comprises a create location event subscribe response message.

In an embodiment, the plurality of parameters comprises an expiry time, a time interval, a total number of users, a list of user identities (IDs), and a user identity (ID) associated with the client SIP node.

In an embodiment, the create location event subscribe response message comprises the expiry time and the unique subscription identifier.

In an embodiment, the method further includes configuring, by the client SIP node, value of the expiry time, the expiry time is a time till when the client SIP node wants to receive a current status and later notifications of the subscription. Further, the method includes configuring, by the client SIP node, value of the time interval, the time interval is a period between two consecutive notifications as indicated by the client SIP node. Further, the method includes configuring, by the client SIP node, value of the total number of users for which the client SIP node required the location information. Further, the method includes adding, by the client SIP node, the user ID for each user and an integer uniquely representing the user among the list of user IDs.

In an embodiment, the method further includes re-configuring, by the server SIP node, the expiry time, value of the expiry time as present in the received SIP message is not acceptable by the server SIP node, the server SIP node changes value of the expiry time to a different value than the present in the received SIP message. Further, the method includes re-configuring, by the server SIP node, the total number of users for which the client SIP node required the location information. Further, the method includes adding, by the server SIP node, the user ID for each user from the reconfigured total number of users. Further, the method includes initiating, by the server SIP node, the subscription expiry timer, and a notification interval timer based on the configuration of the server SIP node.

In an embodiment, the method further includes receiving, by the server SIP node, a SIP message from the client SIP node to modify the created subscription over the SIP for the location information of the multiple users, where the SIP message comprises a modify location event subscribe request message, where the modify location event subscribe request message comprises the unique subscription identifier and updated the plurality of parameters. Further, the method includes sending, by the server SIP node, a response message to the client SIP node in response to receiving the SIP message. Further, the method includes configuring, by the server SIP node, the plurality of parameters based on the updated plurality of parameters and restarting the expiry timer. Further, the method includes modifying, by the server SIP node, the created subscription over the SIP for the location information of the multiple users based on the received SIP message from the client SIP node and sending a SIP message to the client SIP node, where the SIP message comprises a modify location event subscribe response message.

In an embodiment, the modify location event subscribe response message comprises an updated expiry time and the unique subscription identifier.

In an embodiment, the method further includes receiving, by the server SIP node, a SIP message from the client SIP node to delete the created subscription over the SIP for the location information of the multiple users, the SIP message comprises a delete location event subscribe request message, the delete location event subscribe request message comprises the unique subscription identifier and an expiry time, value of the expiry time is zero. Further, the method includes sending, by the server SIP node, a response message to the client SIP node in response to receiving the SIP message. Further, the method includes deleting, by the server SIP node, the stored subscription over the SIP for the location information of the multiple users and the plurality of parameters associated with the received SIP message from the client SIP node. Further, the method includes sending, by the server SIP node, a SIP message to the client SIP node, the SIP message comprises a delete location event subscribe response message and terminates the expiry time and the time interval.

In an embodiment, the method further includes sending, by the server SIP node, a SIP message to the client SIP node to notify the location information of the multiple users, the SIP message comprises a location event notify message, the location event notify message comprises the unique subscription identifier and location data to be notified.

In an embodiment, the client SIP node stores the location data and shares the location data with at least one user when the client SIP node receives the SIP message from the server SIP node.

In an embodiment, the method further includes sending, by the server SIP node, a SIP message to the client SIP node to terminate the created subscription over the SIP for the location information of the multiple users, the SIP message comprises a terminate location event subscribe message, the terminate location event subscribe message comprises the unique subscription identifier.

In an embodiment, the client SIP node deletes the created subscription, terminates the subscription expiry timer and the notification interval timer when the client SIP node receives the SIP message from the server SIP node.

All above mentioned embodiments are applicable to create/modify/delete/notify/terminate the custom subscription over the SIP for custom information (e.g., sensor data, satellite data, location data, etc.).

Accordingly, the embodiments herein provide the server SIP node for providing the generic framework to manage the custom subscription over the SIP. The server SIP includes a subscription controller coupled with a processor and a memory. The subscription controller is configured to receive the SIP message from the client SIP node to create the custom subscription over the SIP for custom information s. Further, the subscription controller is configured to send the response message to the client SIP node in response to receiving the SIP message. Further, the subscription controller is configured to store the received plurality of parameters to create the subscription context. Further, the subscription controller is configured to generate the unique subscription identifier in response to receiving the SIP message for creating the subscription over the SIP for the location information and starting the subscription expiry timer. Further, the subscription controller is configured to create the custom subscription for the custom information based on the subscription context from the received SIP message and assign the unique subscription identifier to the created custom subscription, the SIP message comprises a create location event subscribe response message.

Accordingly, the embodiments herein provide the client SIP node for providing the generic framework to manage the custom subscription over the SIP. The client SIP includes a subscription controller coupled with a processor and a memory. The subscription controller is configured to send the SIP message to the server SIP node. The subscription controller is configured to set value of the expiry time, the expiry time is a time till when the client SIP node wants to receive the current status and later notifications of the subscription. The subscription controller is configured to set value of the time interval, the time interval is the period between two consecutive notifications as indicated by the client SIP node. The subscription controller is configured to set value of the total number of users for which the client SIP node required the location information. The subscription controller is configured to add the user ID for each user and an integer uniquely representing the user among the list of user IDs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

In accordance with an aspect of the present disclosure, an embodiment of the present invention provides a method for managing a custom subscription over a Session Initiation Protocol (SIP) by a server SIP node, the method comprises: receiving, from a client SIP node, a first SIP message to request a creation of the custom subscription over the SIP for custom information, wherein the first SIP message comprises at least one parameter for the custom subscription; sending, to the client SIP node, a response message in response to receiving the first SIP message; storing the received at least one parameter; generating a unique subscription identifier for identifying the custom subscription; transmitting, to the client SIP node, the second SIP message including the unique subscription identifier.

In an embodiment, wherein the at least one parameter comprise at least one of an expiry time, a time interval and at least one other subscription related parameter, and wherein the time interval is a period between two consecutive notifications of the custom subscription.

In an embodiment, wherein the second SIP message further comprises at least one of an accepted expiry time, and at least one other subscription related parameter.

In an embodiment, wherein the method further comprises: re-configuring a expiry time for the custom subscription, in case that value of the expiry time included in the first SIP message is not acceptable by the server SIP node; and initiating the subscription expiry timer and setting the expiry time of the subscription expiry time to the re-configured value.

In an embodiment, wherein the method further comprises: receiving, from the client SIP node, a third SIP message to request a deletion of the custom subscription over the SIP for the custom information, wherein the third SIP message comprises the unique subscription identifier and an expiry time, wherein value of the expiry time is zero; sending, to the client SIP node, a response message in response to receiving the SIP message; deleting the stored at least one parameter associated with the custom subscription; and sending, to the client SIP node, a fourth SIP message and terminating a subscription expiry timer and a notification interval timer, wherein the fourth SIP message comprises the unique subscription identifier.

In an embodiment, wherein the method further comprises: sending, to the client SIP node, a fifth SIP message to notify the custom information, wherein the SIP message comprises the unique subscription identifier and data to be notified.

In an embodiment, wherein the custom information is location information of multiple users and the custom subscription is a subscription for the location information of multiple users, and wherein the at least one parameter comprises at least one of an expiry time, a time interval, a total number of users, a list of user identities (IDs) along with unique user number for each user, and a user identity (ID) associated with the client SIP node.

In an embodiment, wherein the custom information is location information of multiple users and the custom subscription is a subscription for the location information of multiple users, and wherein the second SIP message further comprises at least one of the expiry time, the total number of users and the list of user IDs along with unique user number for each user.

In accordance with an aspect of the present disclosure, an embodiment of the present invention provides a server Session Initiation Protocol (SIP) node for managing a custom subscription over the SIP, the server SIP node comprising: a memory; a processor; and a subscription controller, operably connected to the memory and the processor, configured to: receive a first SIP message from a client SIP node to request a creation of the custom subscription over the SIP for custom information, wherein the first SIP message comprises at least one parameter for the custom subscription; send a response message to the client SIP node in response to receiving the first SIP message; store the received at least one parameter; generate a unique subscription identifier for identifying the custom subscription; and transmit the second SIP message including the unique subscription identifier to the client SIP node.

In an embodiment, wherein the at least one parameter comprises at least one of an expiry time of the custom subscription, a time interval and at least one other subscription related parameter, and wherein the time interval is a period between two consecutive notifications of the custom subscription.

In an embodiment, wherein the second SIP message further comprises at least one of an accepted expiry time, and at least one other subscription related parameter.

In an embodiment, wherein the subscription controller is further configured to: re-configure the expiry time for the custom subscription, in case that value of the expiry time included in the first SIP message is not acceptable by the server SIP node; and initiate the subscription expiry timer and setting the expiry time of the subscription expiry time to the re-configured value.

In an embodiment, wherein the subscription controller is further configured to: receive a third SIP message from the client SIP node to request a deletion of the custom subscription over the SIP for the custom information, wherein the third SIP message comprises the unique subscription identifier and an expiry time, wherein value of the expiry time is zero; send a response message to the client SIP node in response to receiving the SIP message; delete the stored at least one parameter associated with the custom subscription; and send a fourth SIP message to the client SIP node, wherein the SIP message and terminate a subscription expiry timer and a notification interval timer, wherein the fourth SIP message comprises the unique subscription identifier.

In an embodiment, wherein the subscription controller is further configured to send a fifth SIP message to the client SIP node to notify the custom information, wherein the fifth SIP message comprises the unique subscription identifier and data to be notified.

In an embodiment, wherein the client SIP node stores the data and shares the data with at least one user in case that the client SIP node receives the fifth SIP message from the server SIP node.

In an embodiment, wherein the subscription controller is further configured to send a SIP message to the client SIP node to terminate the created custom subscription over the SIP for the custom information, wherein the SIP message comprises a terminate custom subscription message including the unique subscription identifier.

In accordance with an aspect of the present disclosure, an embodiment of the present invention provides client Session Initiation Protocol (SIP) node for providing a framework to manage a custom subscription over the SIP, the client SIP node (100) comprising: a memory (110); a processor (120); and a subscription controller (140), operably connected to the memory (110) and the processor (120), configured to: send a SIP message to a server SIP node to perform one of to create, modify, delete subscription over the SIP for custom information, wherein the SIP message comprises one of create custom subscription request message, modify custom subscription request message, and delete custom subscription request message, wherein each message includes a plurality of parameters; configure value of the expiry time, wherein an expiry time is a time till when the client SIP node wants to receive a current status and later notifications of the subscription; configure value of a time interval, wherein the time interval is a period between two consecutive notifications; and configure other required parameters as per subscription data type.

In an embodiment, wherein the plurality of parameters comprises the expiry time, the time interval, and other subscription related parameters.

In an embodiment, wherein the subscription controller is further configured to receive a SIP message from a server SIP node (200) to perform one of to notify and terminate custom subscription for custom information, wherein the SIP message comprises one of custom subscription notify message and terminate custom subscription message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2CA and 2CB illustrate various message formats of a plurality of parameters to manage the custom subscription over the SIP according to an embodiment as disclosed herein;

DETAILED DESCRIPTION

Figure 1:
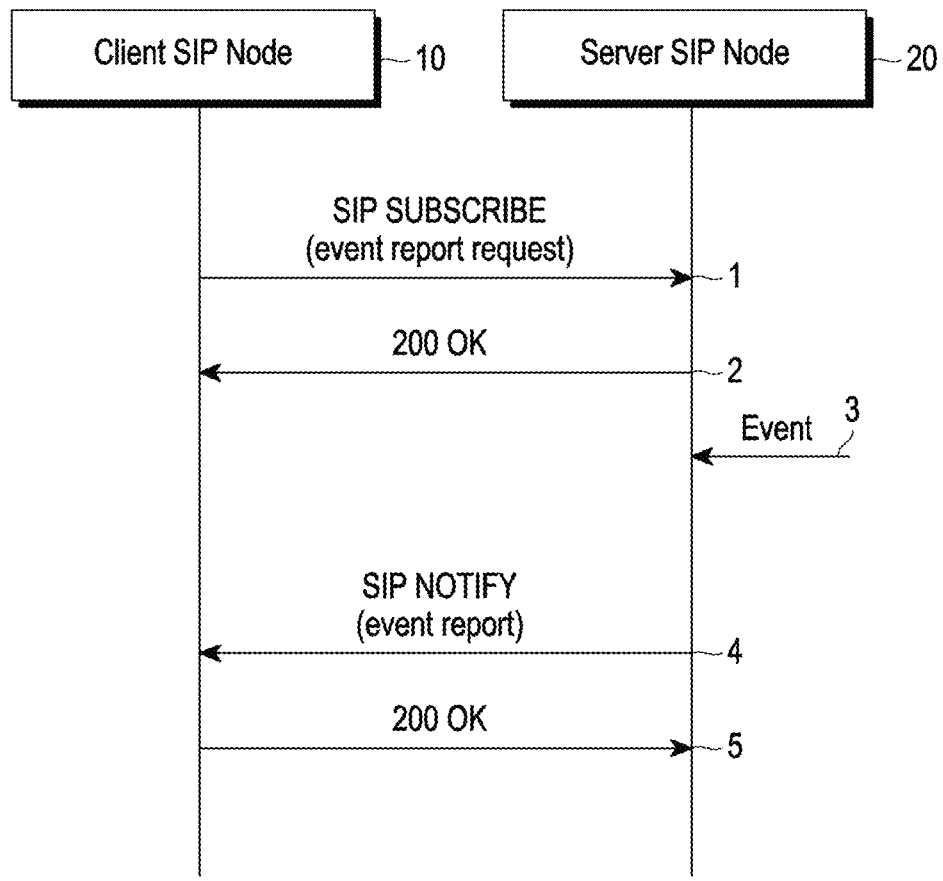
FIG. 1 is a sequence diagram illustrating an existing SIP-based subscribe mechanism.

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "client," "client SIP node," "VAL server (client)" and "VAL server" are used interchangeably and means the same. The terms "server," "server SIP node," "SLM-S (server)" and "SLM-S" are used interchangeably and means the same.

Accordingly, the embodiments herein disclose a method for providing a generic framework to manage a custom subscription over a SIP. The method includes receiving, by a server SIP node, a SIP message from a client SIP node to create the custom subscription over the SIP for custom information, where the SIP message comprises a create custom subscription request message, where the create custom subscription request message comprises a plurality of parameters. Further, the method includes sending, by the server SIP node, a response message to the client SIP node in response to receiving the SIP message. Further, the method includes generating, by the server SIP node, a unique subscription identifier in response to receiving the SIP message for creating the subscription over the SIP for the custom information and starting a subscription expiry timer. Further, the method includes creating, by the server SIP node, the custom subscription for the custom information based on the subscription context from the received SIP message and assigning the unique subscription identifier to the created custom subscription, where the SIP message comprises a create custom subscription response message.

Accordingly, the embodiments herein disclose a method for providing a generic framework to manage a custom subscription over a SIP. The method includes receiving, by a server SIP node, a SIP message from a client SIP node to create the subscription over the SIP for location information of multiple users, the SIP message comprises a create location event subscribe request message, the create location event subscribe request message comprises a plurality of parameters. Further, the method includes sending, by the server SIP node, a response message to the client SIP node in response to receiving the SIP message. Further, the method includes storing, by the server SIP node, the received plurality of parameters to create a subscription context. Further, the method includes generating, by the server SIP node, a unique subscription identifier in response to receiving the SIP message for creating the subscription over the SIP for the location information and starting a subscription expiry timer. Further, the method includes creating, by the server SIP node, the custom subscription for the location information of the multiple users based on the subscription context from the received SIP message and assigning the unique subscription identifier to the created custom subscription by sending a SIP message to the client SIP node, the SIP message comprises a create location event subscribe response message.

Accordingly, the embodiments herein provide the server SIP node for providing the generic framework to manage the custom subscription over the SIP. The server SIP includes a subscription controller coupled with a processor and a memory. The subscription controller is configured to receive the SIP message from the client SIP node to create the custom subscription over the SIP for custom information. Further, the subscription controller is configured to send the response message to the client SIP node in response to receiving the SIP message. Further, the subscription controller is configured to store the received plurality of parameters to create the subscription context. Further, the subscription controller is configured to generate the unique subscription identifier in response to receiving the SIP message for creating the subscription over the SIP for the custom information and starting the subscription expiry timer. Further, the subscription controller is configured to create the custom subscription over the SIP for the custom information based on the subscription context from the received SIP message and assigning the unique subscription identifier to the created custom subscription, the SIP message comprises a create location event subscribe response message.

Accordingly, the embodiments herein provide the client SIP node for providing the generic framework to manage the custom subscription over the SIP. The client SIP includes a subscription controller coupled with a processor and a memory. The subscription controller is configured to send the SIP message to the server SIP node. The subscription controller is configured to set value of the expiry time, the expiry time is a time till when the client SIP node wants to receive the current status and later notifications of the subscription. The subscription controller is configured to set value of the time interval, the time interval is the period between two consecutive notifications as indicated by the client SIP node. The subscription controller is configured to set value of the total number of users for which the client SIP node required the custom information. The subscription controller is configured to add the user ID for each user and an integer uniquely representing the user among the list of user IDs.

Unlike existing methods and systems, the provided method and SIP node provides a generic framework to manage a custom subscription by sending at least one request with a plurality of parameters to a server SIP node for any type of data over a SIP regardless of an event package is available or not available in the at least one request.

Unlike existing methods and systems, the provided method and SIP node provides a custom subscription for a location management service associated with a SLM-S over the SIP regardless of the event package is available or not available in the at least one request received from a VAL server. The SLM-S allows the VAL server to manage a location information of VAL users using the plurality of parameters.

Unlike existing methods and systems, the provided client SIP node manages the custom subscription by sending at least one request with a plurality of parameters to the server SIP node for any type of data over the SIP regardless of an event package is available or not. The custom subscription is managed by one of creating the custom subscription, modifying the custom subscription, deleting the custom subscription, notifying the custom subscription, and terminating the custom subscription using the plurality of parameters. So, the provided client SIP node does not require the event package in the SIP message to subscribe various services associated with the server SIP node.

Referring now to the drawings, and more particularly to FIGS. 2A through 7B, where similar reference characters denote corresponding features consistently throughout the figures, there are shown preferred embodiments.

Figure 2A:
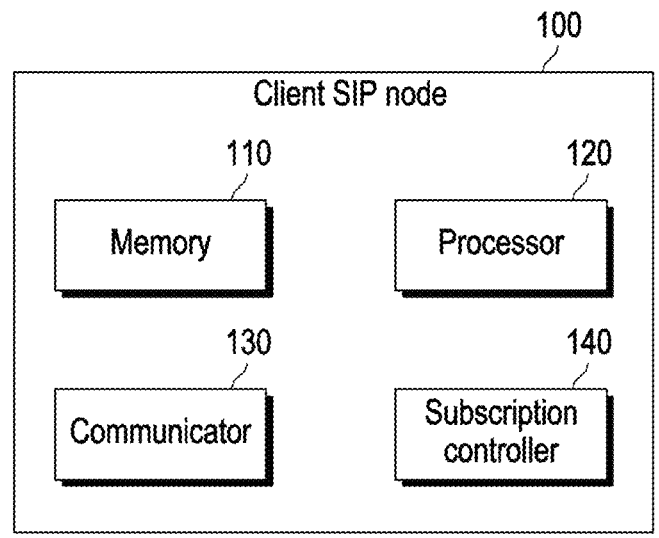
FIG. 2A illustrates a block diagram of a client SIP node to manage a custom subscription over the SIP according to an embodiment as disclosed herein.

FIG. 2A illustrates a block diagram of a client SIP node (100) to manage a custom subscription over the SIP, according to an embodiment as disclosed herein. The client SIP node (100) can be, for example, but not limited, to a user equipment (UE), a VAL server.

In an embodiment, the client SIP node (100) includes a memory (110), a processor (120), a communicator (130), and a subscription controller (140).

In an embodiment, the memory (110) is configured to store a configuration of a plurality of parameters. The plurality of parameters comprises an expiry time, a time interval, a total number of users, a list of user identities (IDs), and a user identity (ID) associated with the client SIP node (100). The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In certain examples, a non-transitory storage medium may store data that can, over time, change (e.g., in random access memory (RAM) or cache). The memory (110) can be an internal storage unit or it can be an external storage unit of the client SIP node (100), a cloud storage, or any other type of external storage.

The processor (120) communicates with the memory (110), the communicator (130), and the subscription controller (140). The processor (120) is configured to execute instructions stored in the memory (110) and to perform various processes. The processor may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) is configured for communicating internally between internal hardware components and with external devices (e.g., server SIP node (200)) via one or more networks (e.g., internet, Wi-Fi, Bluetooth, etc.). The communicator (130) includes an electronic circuit specific to a standard that enables wired or wireless communication.

The subscription controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the subscription controller (140) is configured to send a SIP message to a server SIP node (200) to create/modify/delete/the custom subscription (e.g., subscription for location) over the SIP for custom information (e.g., location information, sensor information, etc.) of multiple users. Further, the subscription controller (140) is configured to receive the SIP message from the server SIP node (200) to notify/terminate the created custom subscription over the SIP for custom information of multiple users.

The SIP message comprises one of create custom subscription request message, modify custom subscription request message, delete custom subscription request message, custom subscription notify message, and terminate custom subscription message. Each message includes a plurality of parameters (e.g., an expiry time, a time interval, a total number of users, a list of user identities (IDs) along with unique user number for each user, and a user identity (ID)).

The custom subscription request message includes the expiry time, the time interval, the total number of users, the list of user IDs, and the user ID. The modify custom subscription request message includes a unique subscription identifier and updated the plurality of parameters. The delete custom subscription request message includes the unique subscription identifier and an expiry time, where value of the expiry time is zero. The custom subscription notify message includes the unique subscription identifier and custom data to be notified. The terminate custom subscription message includes the unique subscription identifier.

In an embodiment, the subscription controller (140) is configured to set value of the expiry time, where the expiry time is a time till when the client SIP node (100) wants to receive a current status and later notifications of the subscription. Further, the subscription controller (140) is configured to set value of the time interval, where the time interval is a period between two consecutive notifications as indicated by the client SIP node (100). Further, the subscription controller (140) is configured to set value of the total number of users for which the client SIP node (100) required the location information. Further, the subscription controller (140) is configured to add the user ID for each user and an integer uniquely representing the user among the list of user IDs.

Although the FIG. 2A shows various hardware components of the client SIP node (100) but it is to be understood that other embodiments are not limited thereon. In other embodiments, the client SIP node (100) may include less or more number of components. Further, the labels or names of the components are used only for illustrative purpose and does not limit the scope of the disclosure. One or more components can be combined together to perform same or substantially similar function to provide the generic framework to manage the custom subscription over the SIP.

Figure 2B:
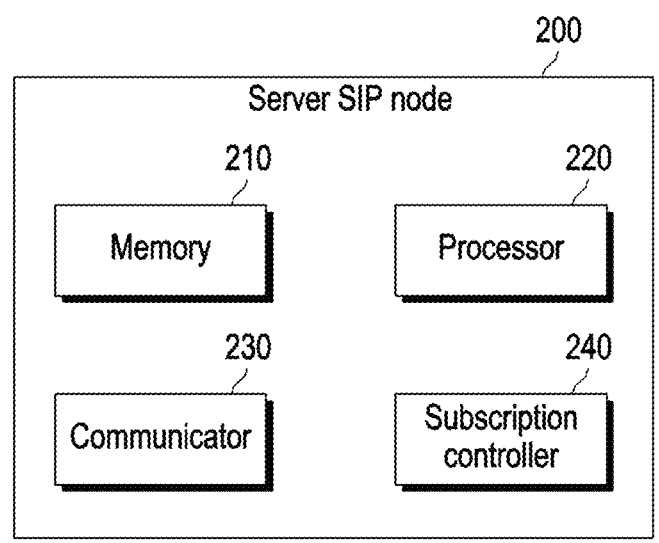
FIG. 2B illustrates a block diagram of a server SIP node entity to manage the custom subscription over the SIP according to an embodiment as disclosed herein.

FIG. 2B illustrates a block diagram of the server SIP node (200) to manage the custom subscription over the SIP, according to an embodiment as disclosed herein.

In an embodiment, the server SIP node (200) includes a memory (210), a processor (220), a communicator (230), and a subscription controller (240).

In an embodiment, the memory (210) is configured to store a configuration of the plurality of parameters. The memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In certain examples, a non-transitory storage medium may store data that can, over time, change (e.g., in random access memory (RAM) or cache). The memory (210) can be an internal storage unit or it can be an external storage unit of the client SIP node (200), a cloud storage, or any other type of external storage.

The processor (220) communicates with the memory (210), the communicator (230), and the subscription controller (240). The processor (220) is configured to execute instructions stored in the memory (210) and to perform various processes. The processor may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230) is configured for communicating internally between internal hardware components and with external devices (e.g., client SIP node (100)) via one or more networks (e.g., internet, Wi-Fi, Bluetooth, etc.). The communicator (230) includes an electronic circuit specific to a standard that enables wired or wireless communication.

The subscription controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the subscription controller (240) is configured to receive the SIP message from the client SIP node (100) to create the custom subscription over the SIP for custom information, where the SIP message comprises the create custom subscription request message, where the create custom subscription request message comprises the plurality of parameters. Further, the subscription controller (240) is configured to send a response message to the client SIP node (100) in response to receiving the SIP message. Further, the subscription controller (240) is configured to store the received plurality of parameters to create a subscription context. Further, the subscription controller (240) is configured to generate the unique subscription identifier in response to receiving the SIP message for creating the subscription over the SIP for the custom information and starting a subscription expiry timer. Further, the subscription controller (240) is configured to assign the unique subscription identifier to the received SIP message from the client SIP node (100). Further, the subscription controller (240) is configured to create the subscription over the SIP for the custom information of the multiple users based on the subscription context by sending a SIP message to the client SIP node (100), where the SIP message comprises a create custom subscription response message. The create custom subscription response message comprises the expiry time and the unique subscription identifier.

Further, the subscription controller (240) is configured to change the expiry time, where value of the expiry time as present in the received SIP message is not acceptable by the server SIP node (200), the server SIP node (200) changes value of the expiry time to a different value than the present in the received SIP message. Further, the subscription controller (240) is configured to change the total number of users for which the client SIP node (100) required the location information. Further, the subscription controller (240) is configured to add the user ID for each user from the reconfigured total number of users. Further, the subscription controller (240) is configured to initiate the subscription expiry timer and a notification interval timer based on the configuration of the server SIP node (200).

Further, the subscription controller (240) is configured to receive a SIP message from the client SIP node (100) to modify the created custom subscription over the SIP for the custom information of the multiple users, where the SIP message comprises a modify custom subscription request message, where the modify custom subscription request message comprises the unique subscription identifier and updated the plurality of parameters. Further, the subscription controller (240) is configured to update the plurality of parameters based on the updated plurality of parameters and restarting the expiry timer. Further, the subscription controller (240) is configured to modify the created custom subscription over the SIP for the custom information of the multiple users based on the received SIP message from the client SIP node (100) and sending a SIP message to the client SIP node (100), where the SIP message comprises a modify custom subscription response message. The modify custom subscription response message comprises an updated expiry time and the unique subscription identifier.

Further, the subscription controller (240) is configured to receive a SIP message from the client SIP node (100) to delete the created custom subscription over the SIP for the custom information of the multiple users, where the SIP message comprises a delete custom subscription request message, where the delete custom subscription request message comprises the unique subscription identifier and an expiry time, where value of the expiry time is zero. Further, the subscription controller (240) is configured to delete the stored custom subscription over the SIP for the location information of the multiple users and the plurality of parameters associated with the received SIP message from the client SIP node (100). Further, the subscription controller (240) is configured to send a SIP message to the client SIP node (100), where the SIP message comprises a delete custom subscription response message and terminates the expiry time and the time interval.

Further, the subscription controller (240) is configured to notify a SIP message to the client SIP node (100) to notify the custom information of the multiple users, where the SIP message comprises a custom subscription notify message, where the custom subscription notify message comprises the unique subscription identifier and custom data to be notified. The client SIP node (100) stores the custom data and shares the custom data with at least one user when the client SIP node (100) receives the SIP message from the server SIP node (200).

Further, the subscription controller (240) is configured to send a SIP message to the client SIP node (100) to terminate the created custom subscription over the SIP for the custom information of the multiple users, where the SIP message comprises a terminate custom subscription message, where the terminate custom subscription message comprises the unique subscription identifier. The client SIP node (100) deletes the created custom subscription, terminates the subscription expiry timer and the notification interval timer when the client SIP node (100) receives the SIP message from the server SIP node (200).

Although the FIG. 2B shows various hardware components of the server SIP node (200) but it is to be understood that other embodiments are not limited thereon. In other embodiments, the server SIP node (200) may include less or more number of components. Further, the labels or names of the components are used only for illustrative purpose and does not limit the scope of the disclosure. One or more components can be combined together to perform same or substantially similar function to provide the generic framework to manage the custom subscription over the SIP.

FIGS. 2CA and 2CB illustrate various message formats of the plurality of parameters to manage the custom subscription over the SIP, according to an embodiment as disclosed herein.

The least significant bit of a field is represented by the lowest numbered bit of the highest numbered octet of the field. When the field extends over more than one octet, the order of bit values progressively decreases as the octet number increases. The purpose of a message type information element (201) is to identify a type of the message. The message type information element is a type 3 information element with a length of 1 octet.

In an embodiment, an expiry time information element (202) is used to indicate a duration in seconds till subscription remains active/expiry time value is an unsigned integer specifying time in seconds for the duration of subscription to remain active. The expiry time information element is a type 3 information element with a length of 3 octets.

In an embodiment, a time interval information element (203) is to provide time (in seconds) between two consecutive notifications from the server SIP node (200)/expiry time value is an unsigned integer specifying time in seconds for the duration between two consecutive notifications. The time interval information element is a type 3 information element with a length of 2 octets.

In an embodiment, a subscription identifier information element (204) uniquely identifies an event subscription. The subscription identifier information element is a type 3 information element with a length of 4 octet. The subscription identifier contains a number uniquely identifying the subscription request to the VAL server (100) which may have performed multiple subscriptions.

In an embodiment, a number of user information element (205) identifies the number of users contained in the message. The number of user information element is a type 3 information element with a length of 2 octet. The number of users contains a value from 1 to 255. The number of user value is contained in octet 2 if the IE is used as an optional information element. If used as a mandatory information element, the number of user information element is omitted and the number of user value is contained in octet 1.

In an embodiment, a user identity information element (206) is used to indicate a VAL user ID. The user identity information element is a type 6 information element.

In an embodiment, a VAL user number (207) contains a unique number assigned to each VAL user ID contents. The SLM-S (200) uses this number to send location information for the assigned VAL user ID. The VAL user number starts with 1 and is incremented by 1 for each user identity IE. The VAL user number value is contained in octet 4 if the IE is used as an optional IE. If used as a mandatory IE, The User Identity IEI is omitted and The VAL user number value is contained in octet 3. The VAL user ID is contained in octet 4 to octet n, max value of 65535 octets. The VAL user ID value is contained in octet 5 to octet n, if the IE is used as an optional IE. If used as a mandatory IE, The User Identity IEI is omitted and The VAL user ID value is contained in octet 4 to octet n.

In an embodiment, a user location data information element (208) is used to indicate the current location of the VAL user. The User location data information element is a type 6 information element. The VAL user number contains a unique number as specified in the location event subscribe request message. The user location is contained in octet 5 to octet n, max value of 65535 octets.

In an embodiment, following procedures provides the server (200) side behavior on expiry of different timers:

a. on expiry of a TLM-1 (subscription expiry) timer, the SLM-S (200) considers the subscription terminated and deletes all data related to the subscription; and b. on expiry of a TLM-2 (notification interval) timer, the SLM-S (200) checks if any notification is pending to send or not. The SLM-S (200) sends notification if any pending notifications are present.

The following sub-clauses describe the location management message functional definitions and contents. Each message includes a series of information elements.

In an embodiment, create a location event subscribe request message (201): the message is sent by the VAL server (100) to the SLM-S (200) to request the SLM-S (200) to create subscription for the location information of the VAL users as specified in the request message. Message content is described in Table 1.

TABLE 1

| Information Element | Type/ Reference | Presence | Format | Length |
|---|---|---|---|---|
| Create Location Event Subscribe Request message identity | Message type (201) | M | V | 1 |
| Expiry Time IE | Expiry Time type (202) | M | V | 3 |
| Time interval type IE | Time interval type (203) | M | V | 2 |
| Number of users IE | Number of users (205) | M | V | 1 |
| User identity IE | User identity type (206) | M | LV-E | 4-x |

The SLM-S (200) may decide to support create, modify and delete subscription using single request message only. In such case, an optional subscription identifier IE is added in Table1. The VAL server (100) includes subscription identifier IE value when the VAL server (100) requests to modify or delete the subscription. In an embodiment, the information elements as specified in Table1 can be sent over any data format (e.g., XML).

In an embodiment, create location event subscribe response message (201): This message is sent by the SLM-S server (200) to the VAL server (100) as a response to the create location event subscribe request message. Message content is described in Table 2.

TABLE 2

| Information Element | Type/ Reference | Presence | Format | Length |
|---|---|---|---|---|
| Create Location Event Subscribe Response message identity | Message type (201) | M | V | 1 |
| Subscription Identifier IE | Subscription Identifier (204) | M | V | 4 |
| Expiry Time IE | Expiry Time type (202) | M | V | 3 |
| Number of users IE | Number of users (205) | O | TV | 2 |
| User identity IE | User identity type (206) | O | TLV-E | 5-x |

In an embodiment, the information elements as specified in Table2 can be sent over any data format (e.g., XML). In an embodiment, an integer number can be used as information element identity value.

In an embodiment, modify a location event subscribe request message (201): this message is sent by the VAL server (100) to the SLM-S (200) to request the SLM-S (200) to modify subscription for the location information of the VAL users as specified in the request message. Message content is described in Table 3.

TABLE 3

| Information Element | Type/ Reference | Presence | Format | Length |
|---|---|---|---|---|
| Modify location event subscribe request message identity | Message type (201) | M | V | 1 |
| Subscription Identifier IE | Subscription Identifier (204) | M | V | 4 |
| Expiry Time IE | ExpiryTime type (202) | M | V | 3 |
| Time interval type IE | Time interval type (203) | M | V | 2 |
| Number of users IE | Number of users (205) | O | TV | 2 |
| User identity IE | User identity type (206) | O | TLV-E | 5-x |

In an embodiment, the information elements as specified in Table3 can be sent over any data format (e.g., XML). In an embodiment, an integer number can be used as information element identity value.

In an embodiment, modify a location event subscribe response message: this message is sent by the SLM-S server (200) to the VAL server (100) as a response to the modify location event subscribe request message. Message content is described in Table 4.

TABLE 4

| Information Element | Type/ Reference | Presence | Format | Length |
|---|---|---|---|---|
| Modify location event subscribe response message identity | Message type (201) | M | V | 1 |

TABLE 4-continued

| Information Element | Type/Reference | Presence | Format | Length |
|---|---|---|---|---|
| Subscription Identifier IE | Subscription Identifier (204) | M | V | 4 |
| Expiry Time IE | Expiry Time type (202) | M | V | 3 |
| Number of users IE | Number of users (205) | O | TV | 2 |
| User identity IE | User identity type (206) | O | TLV-E | 5-x |

In an embodiment, the information elements as specified in Table 4 can be sent over any data format (e.g., XML). In an embodiment, an integer number can be used as information element identity value.

In an embodiment, delete a location event subscribe request message (201): this message is sent by the VAL server (100) to the SLM-S (200) to request the SLM-S (200) to delete subscription for the location information of the VAL users as specified in the request message. Message content is described in Table 5.

TABLE 5

| Information Element | Type/Reference | Presence | Format | Length |
|---|---|---|---|---|
| Delete location event subscribe request message identity | Message type (201) | M | V | 1 |
| Subscription Identifier IE | Subscription Identifier (204) | M | V | 4 |
| Expiry Time IE | Expiry Time type (202) | M | V | 3 |

In an embodiment, the information elements as specified in Table 5 can be sent over any data format.

In an embodiment, delete a location event subscribe response message (201): this message is sent by the SLM-S server (200) to the VAL server (100) as a response to the delete location event subscribe request message. Message content is described in Table 6.

TABLE 6

| Information Element | Type/Reference | Presence | Format | Length |
|---|---|---|---|---|
| Delete location event subscribe response message identity | Message type (201) | M | V | 1 |
| Subscription Identifier IE | Subscription Identifier (204) | M | V | 4 |

In an embodiment, the information elements as specified in Table 6 can be sent over any data format.

In an embodiment, a location event notify message (201): this message is sent by the SLM-S (200) to the VAL server (100) to notify the VAL server (100) about the location information of the VAL users as specified in the request message. Message content is described in Table 7.

TABLE 7

| Information Element | Type/Reference | Presence | Format | Length |
|---|---|---|---|---|
| Location event notify message identity | Message type (201) | M | V | 1 |
| Subscription Identifier IE | Subscription Identifier (204) | M | V | 4 |
| Number of users IE | Number of users (205) | M | V | 1 |
| User location data IE | User location data type (208) | M | LV | 5-x |

In an embodiment, the information elements as specified in Table 7 can be sent over any data format.

In an embodiment, terminate a location event subscribe message (201): this message is sent by the SLM-S (200) to the VAL server (100) to notify the VAL server (100) about termination of the subscription. Message content is described in Table 8.

| Information Element | Type/Reference | Presence | Format | Length |
|---|---|---|---|---|
| Terminate event subscribe message identity | Message type (201) | M | V | 1 |
| Subscription Identifier IE | Subscription Identifier (204) | M | V | 4 |

In an embodiment, the information elements as specified in Table.1 can be sent over any data format.

Figure 3A:
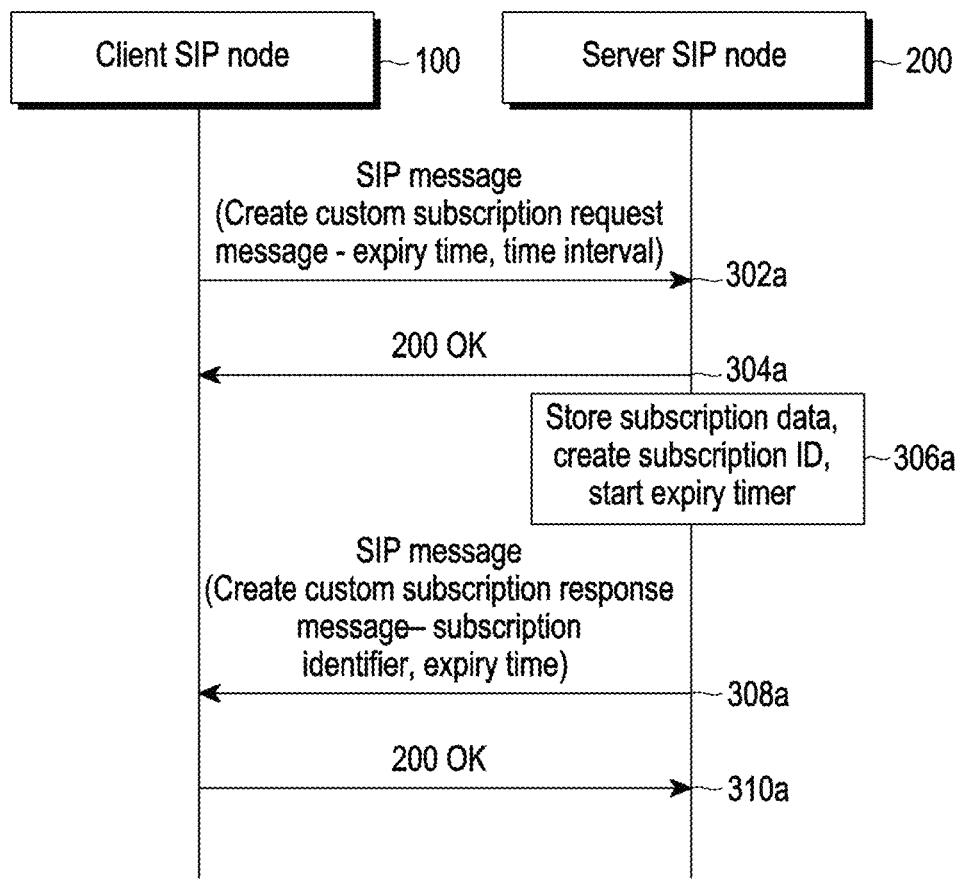
FIG. 3A is a sequence diagram illustrating various operations for creating the custom subscription over the SIP according to an embodiment as disclosed herein.

FIG. 3A is a sequence diagram illustrating various operations for creating the custom subscription over the SIP, according to an embodiment as disclosed herein.

At 302a, the client SIP node (100) generates the SIP message according the 3GPP TS 24.229 and IETF RFC 3428. The SIP message includes the create custom subscription request message containing at least the expiry time (i.e., TLM-1), the time interval (i.e., TLM-2) between two consecutive notifications and other subscription specific data. The client SIP node (100) sends the SIP message towards the server SIP node (200). At 304a, the server SIP node (200) sends the SIP 200 (OK) response towards the client SIP node (100). At 306a, the server SIP node (200) stores the received subscription data and creates the unique subscription identifier and starts the expiry timer. At 308a, the server SIP node (200) generates the SIP message according the 3GPP TS 24.229 and IETF RFC 3428. The SIP message includes the create custom subscription response message containing at least the unique subscription identifier and accepted expiry time for the subscription. The server SIP node (200) sends the SIP message towards the client SIP node (100). At 310a, the client SIP node (100) sends the SIP 200 (OK) response towards the server SIP node (200). The client SIP node (100) starts the subscribe refresh timer (i.e., TLM-3).

Figure 3B:
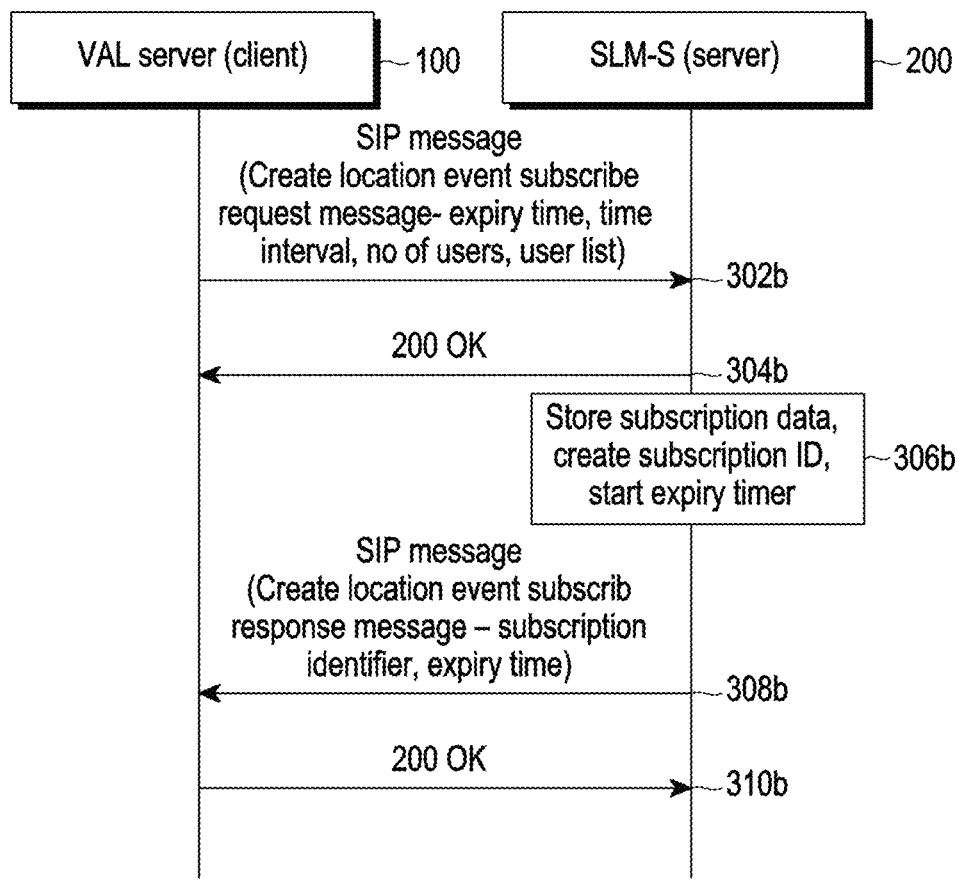
FIG. 3B is a sequence diagram illustrating various operations for creating the custom subscription over the SIP for location information according to an embodiment as disclosed herein.

FIG. 3B is a sequence diagram illustrating various operations for creating the custom subscription over the SIP for the location information, according to an embodiment as disclosed herein. The VAL server act as the client SIP node (100) and the SLM-S act as the server SIP node (200).

At 302b, in order to subscribe to the location information of one or more VAL users or VAL UEs, the VAL server (100):

a. generates the SIP message request according to 3GPP TS 24.229 and IETF RFC 3428;
b. sets request-URI to the identity of the SLM-S (200);
c. includes an accept-contact header field with a media feature tag g.3gpp.icsi-ref set to the value "urn:urn-7:3gpp-service.ims.icsi.seal" along with parameters "require" and "explicit" in accordance with IETF RFC 3841;
d. includes in the SIP message request, the create location event subscribe request message as specified in the FIGS. 2CA and 2CB, in an application/vnd.3gpp.location-event MIME body. In the create location event subscribe request message, the VAL server (100):
  i. sets the expiry time IE to the expiry time as indicated by VAL server (100),
  ii. sets the time interval IE to the time period between two consecutive notifications as indicated by VAL server (100),
  iii. sets the number of user IE to the total number of VAL users for which the VAL server (100) required location information, and
  iv. adds user identity IE for each VAL user. In user identity IE:
    1) sets VAL user number to an integer uniquely representing the VAL user among list of users in the request being sent, and
    2) sets VAL user ID contents to the VAL user ID of the VAL user; and
e. sends the SIP MESSAGE request towards the SLM-S (200) according to 3GPP TS 24.229. In an embodiment, the SIP MESSAGE request towards the SLM-S (200) may include expiry time, time interval, number of user, user identity for each user and other required parameters (e.g., XML or any other data format).

At 304b-306b, upon receiving the SIP message with the application/vnd.3gpp.location-event MIME body containing the create location event subscribe request message, the SLM-S (200):
a. generates the SIP 200 (OK) response and sends towards the VAL server (100);
b. stores all users information contained in user identity IEs and may change the VAL user number associated with the VAL User ID;
c. stores the expiry time for the subscription to the expiry time IE value, if the expiry time value as present in expiry time IE is not acceptable to the SLM-S (200), the SLM-S (200) may change the expiry time value to a different value than the requested value;
d. stores the time interval value to the time interval IE value; and
e. generates and assigns unique integer as the subscription identifier to the subscription request received from the VAL server (100);

At 308b, the SLM-S (200) generates the SIP message request according to 3GPP TS 24.229 and IETF RFC 3428. In the SIP MESSAGE, the SLM-S (200):
a. sets request-URI to the identity of the VAL server (100);
b. includes the accept-contact header field with the media feature tag g.3gpp.icsi-ref set to the value "urn:urn-7:3gpp-service.ims.icsi.seal" along with parameters "require" and "explicit" in accordance with IETF RFC 3841;
c. includes the create location event subscribe response message as specified in the FIGS. 2CA and 2CB, in an application/vnd.3gpp.location-event MIME body. In create location event subscribe response message, the SLM-S (200):
  i. sets the subscription identifier IE to the unique subscription identifier which is assigned to the subscription request,
  ii. sets the expiry time IE to the accepted expiry time value,
  iii. sets the number of user IE to the total number of VAL users if the SLM-S (200) has changed to associated VAL user number for any one of the VAL user ID from the request message, and
  iv. adds user identity IE for each VAL user. In user identity IE:
    1) sets VAL user number to as assigned to the VAL User ID, and
    2) sets VAL User ID contents to the VAL user ID of the VAL user; and
d. sends the SIP message request towards the VAL server (100) according to 3GPP TS 24.229 and starts the timer TLM-1 (subscription expiry) and set the expiry time of the timer to the expiry time for the subscription. In an embodiment, the SIP MESSAGE request towards the VAL server (100) may include the subscription identifier, expiry time, number of users, user identity for each user and other required parameters (e.g., XML or any other data format).

At 310b, upon receiving the SIP message with the application/vnd.3gpp.location-event MIME body containing the create location event subscribe response message, the VAL server (100):
a. stores the subscription identifier IE value;
b. starts the timer TLM-3 (subscription refresh) and sets the expiry time for the TLM-3 (subscription refresh) timer to the ⅔ of the expiry time IE value; and
c. on expiry of the TLM-3 (subscription refresh), based on VAL user's request, the VAL server (100) may modify subscription to set new expiry value.

Figure 4A:
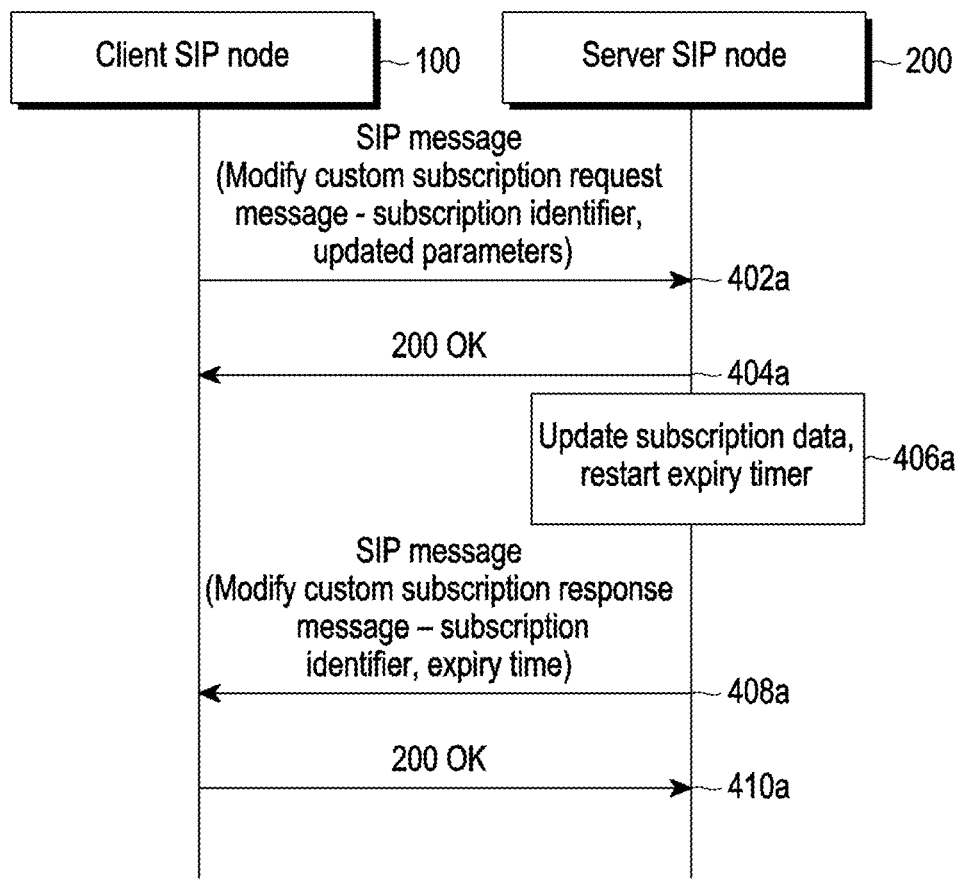
FIG. 4A is a sequence diagram illustrating various operations for modifying the custom subscription over the SIP according to an embodiment as disclosed herein.

FIG. 4A is a sequence diagram illustrating various operations for modifying the custom subscription over the SIP, according to an embodiment as disclosed herein.

At 402a, the client SIP node (100) generates the SIP message according the 3GPP TS 24.229 and IETF RFC 3428. The SIP message includes the modify custom subscription request message containing at least the subscription identifier, the expiry time, the time interval between two consecutive notifications and other subscription specific data. The client SIP node (100) sends the SIP message towards the server SIP node (200). At 404a, the server SIP node (200) sends the SIP 200 (OK) response towards the client SIP node (100). At 406a, the server SIP node (200) updates the subscription data and restarts the expiry timer. At 408a, the server SIP node (200) generates the SIP message according the 3GPP TS 24.229 and IETF RFC 3428. The SIP message includes the modify custom subscription response message containing at least the unique subscription identifier and accepted expiry time for the subscription. The server SIP node (200) sends the SIP message towards the client SIP node (100). At 410a, the client SIP node (100) sends the SIP 200 (OK) response towards the server SIP node (200). The client SIP node (100) restarts the refresh timer.

Figure 4B:
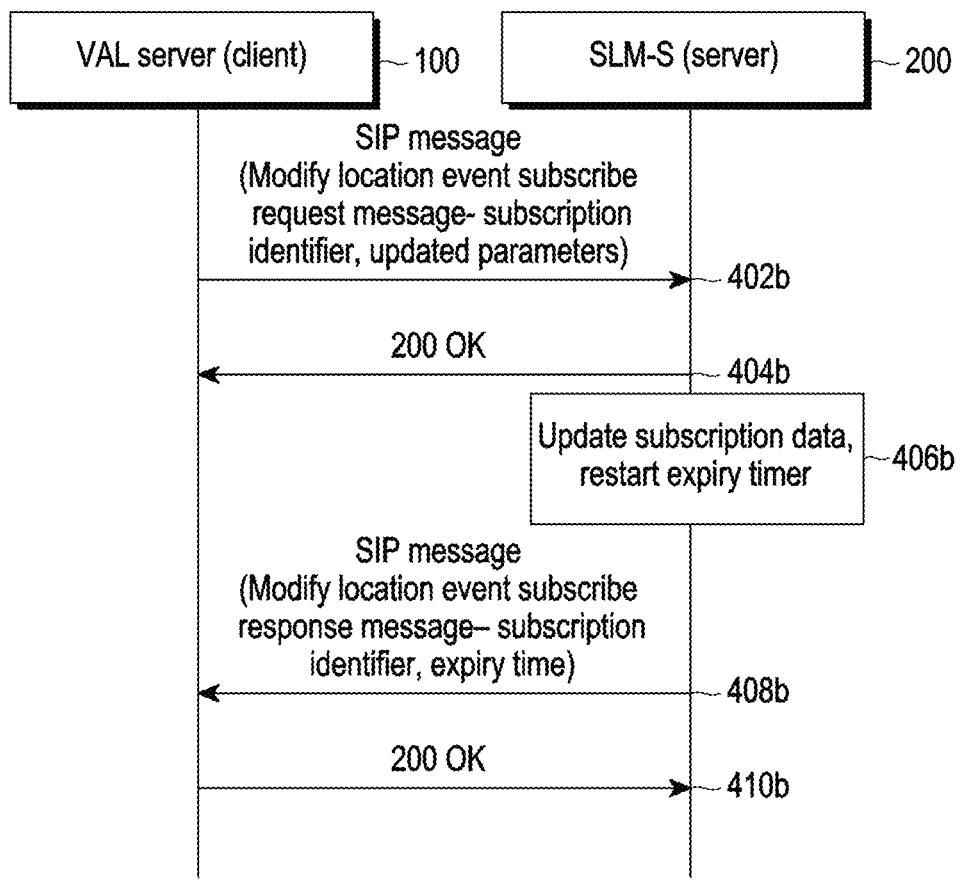
FIG. 4B is a sequence diagram illustrating various operations for modifying the custom subscription over the SIP for the location information according to an embodiment as disclosed herein.

FIG. 4B is a sequence diagram illustrating various operations for modifying the custom subscription over the SIP for the location information, according to an embodiment as disclosed herein.

At 402b, in order to modify the subscription to the location information of one or more VAL users or VAL UEs, the VAL server (100):
a. generates the SIP message request according to 3GPP TS 24.229 and IETF RFC 3428;

b. sets request-URI to the identity of the SLM-S (200);

c. includes an accept-contact header field with a media feature tag g.3gpp.icsi-ref set to the value "urn:urn-7:3gpp-service.ims.icsi.seal" along with parameters "require" and "explicit" in accordance with IETF RFC 3841;

d. includes in the SIP message request, the modify location event subscribe request message as specified in the FIGS. 2CA and 2CB, in an application/vnd.3gpp.location-event MIME body; In the modify location event subscribe request message, the VAL server (100):

i. sets the subscription identifier IE to the subscription identifier value which uniquely identified the subscription, ii. sets the expiry time IE to the expiry time as indicated by VAL server (100), iii. sets the time interval IE to the time period between two consecutive notifications as indicated by VAL server (100), iv. sets the number of user IE to the total number of VAL users for which the VAL server (100) required location information, and v. adds user identity IE for each VAL user. In user identity IE:

1) sets VAL user number to an integer uniquely representing the VAL user among list of users in the request being sent, and 2) sets VAL user ID contents to the VAL user ID of the VAL user; and e. sends the SIP MESSAGE request towards the SLM-S (200) according to 3GPP TS 24.229. In an embodiment, the SIP MESSAGE request towards the SLM-S (200) may include the subscription identifier, expiry time, timer interval, number of users, user identity for each user and other required parameters (e.g., XML or any other data format).

At 404b-406b, upon receiving the SIP message with the application/vnd.3gpp.location-event MIME body containing the modify location event subscribe request message, the SLM-S (200):

a. generates the SIP 200 (OK) response and sends towards the VAL server (100);

b. if available in the request message, stores all users' information contained in user identity IEs and may change the VAL user number associated with the VAL User ID; and c. stores the expiry time for the subscription to the expiry time IE value, if the expiry time value as present in expiry time IE is not acceptable to the SLM-S (200), the SLM-S (200) may change the expiry time value to a different value than the requested value.

At 408b, the SLM-S (200) generates the SIP message request according to 3GPP TS 24.229 and IETF RFC 3428. In the SIP MESSAGE, the SLM-S (200):

a. sets request-URI to the identity of the VAL server (100);

b. includes the accept-contact header field with the media feature tag g.3gpp.icsi-ref set to the value "urn:urn-7:3gpp-service.ims.icsi.seal" along with parameters "require" and "explicit" in accordance with IETF RFC 3841;

c. includes the modify location event subscribe response message as specified in the FIGS. 2CA and 2CB, in an application/vnd.3gpp.location-event MIME body. In create location event subscribe response message, the SLM-S (200):

i. sets the subscription identifier IE to the unique subscription identifier which is assigned to the subscription request, ii. sets the expiry time IE to the accepted expiry time value, iii. sets the number of user IE to the total number of VAL users if the SLM-S (200) has changed to associated VAL user number for any one of the VAL user ID from the request message, and iv. adds user identity IE for each VAL user. In user identity IE:

1) sets VAL user number to as assigned to the VAL User ID, and 2) sets VAL User ID contents to the VAL user ID of the VAL user;

d. send the SIP message request towards the VAL server (100) according to 3GPP TS 24.229 and starts the timer TLM-1 (subscription expiry) and set the expiry time of the timer to the expiry time for the subscription; and e. restarts the timer TLM-1 (subscription expiry) and set the expiry time of the timer to the expiry time for the subscription. In an embodiment, the SIP MESSAGE request towards the VAL server (100) may include the subscription identifier, expiry time, number of users, user identity for each user and other required parameters (e.g., XML or any other data format).

At 410b, upon receiving the SIP message with the application/vnd.3gpp.location-event MIME body containing the create location event subscribe response message, the VAL server (100):

a. stores the subscription identifier IE value; and b. starts the timer TLM-3 (subscription refresh) and sets the expiry time for the TLM-3 (subscription refresh) timer to the ⅔ of the expiry time IE value.

Figure 5A:
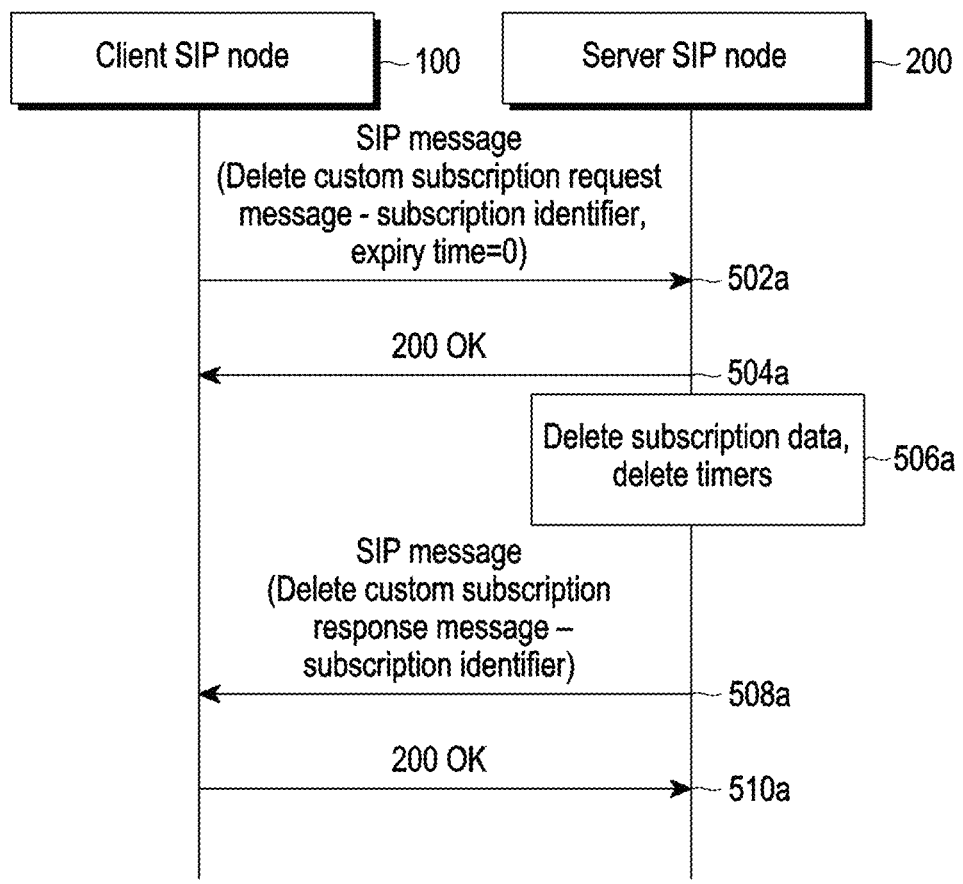
FIG. 5A is a sequence diagram illustrating various operations for deleting the custom subscription over the SIP according to an embodiment as disclosed herein.

FIG. 5A is a sequence diagram illustrating various operations for deleting the custom subscription over the SIP, according to an embodiment as disclosed herein.

At 502a, the client SIP node (100) generates the SIP message according the 3GPP TS 24.229 and IETF RFC 3428. The SIP message includes the delete custom subscription request message containing at least the subscription identifier, and the expiry time value set to value 0. The client SIP node (100) sends the SIP message towards the server SIP node (200). At 504a, the server SIP node (200) sends the SIP 200 (OK) response towards the client SIP node (100). At 506a, the server SIP node (200) deletes the subscription data and also deletes the expiry timer and the notification interval timer. At 508a, the server SIP node (200) generates the SIP message according the 3GPP TS 24.229 and IETF RFC 3428. The SIP message includes the delete custom subscription response message containing at least the unique subscription identifier. The server SIP node (200) sends the SIP message towards the client SIP node (100). At 510a, the client SIP node (100) sends the SIP 200 (OK) response towards the server SIP node (200).

Figure 5B:
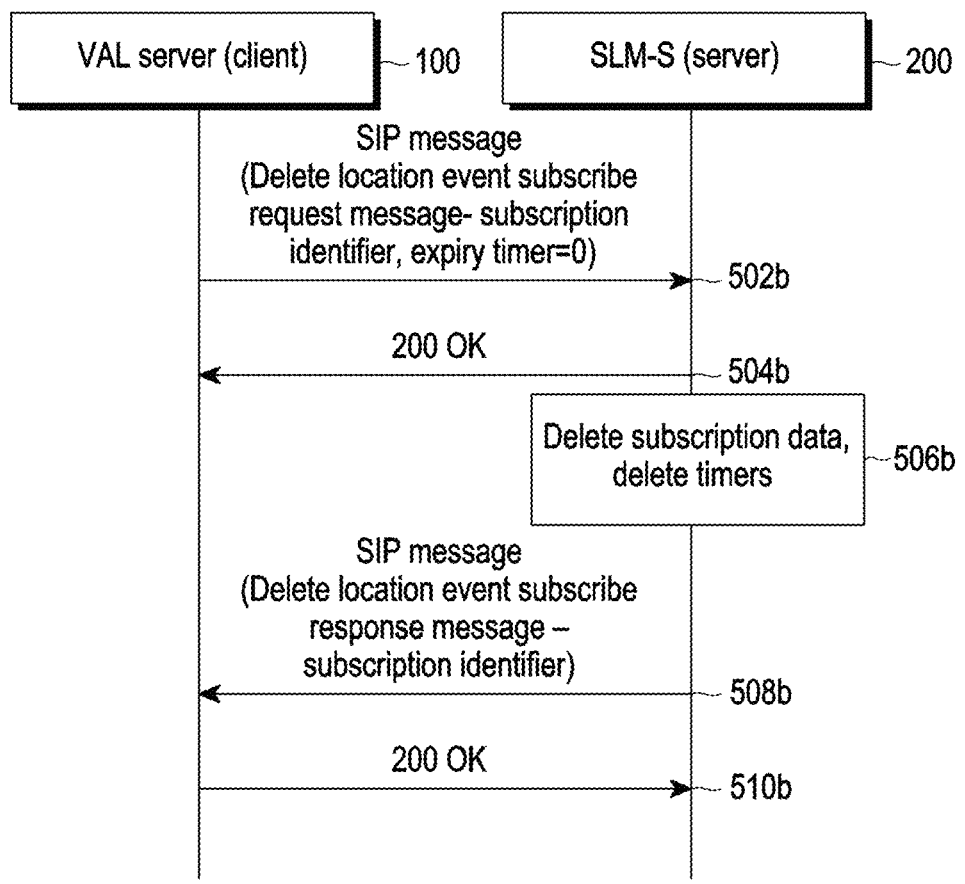
FIG. 5B is a sequence diagram illustrating various operations for deleting the custom subscription over the SIP for the location information, according to an embodiment as disclosed herein.

FIG. 5B is a sequence diagram illustrating various operations for deleting the custom subscription over the SIP for the location information, according to an embodiment as disclosed herein.

At 502b, in order to subscribe to delete the location information of one or more VAL users or VAL UEs, the VAL server (100):

a. generates the SIP message request according to 3GPP TS 24.229 and IETF RFC 3428;

b. sets request-URI to the identity of the SLM-S (200);

c. includes an accept-contact header field with a media feature tag g.3gpp.icsi-ref set to the value "urn:urn-7:3gpp-service.ims.icsi. seal" along with parameters "require" and "explicit" in accordance with IETF RFC 3841;

d. includes in the SIP message request, the delete location event subscribe request message as specified in the FIGS. 2CA and 2CB, in an application/vnd.3gpp.location-event MIME body; In the create location event subscribe request message, the VAL server (100):
  i. sets the subscription identifier IE to the subscription identifier value which uniquely identified the subscription,
  ii. sets the expiry time IE to value 0; and
  e. sends the SIP MESSAGE request towards the SLM-S (200) according to 3GPP TS 24.229. In an embodiment, the SIP MESSAGE request towards the SLM-S (200) may include the subscription identifier, expiry time and other required parameters (e.g., XML or any other data format).

At 504b-506b, upon receiving the SIP message with the application/vnd.3gpp.location-event MIME body containing the delete location event subscribe request message, the SLM-S (200):
  a. generates the SIP 200 (OK) response and sends towards the VAL server (100); and
  b. deletes all information related to subscription.

At 508b, the SLM-S (200) generates the SIP message request according to 3GPP TS 24.229 and IETF RFC 3428. In the SIP MESSAGE, the SLM-S (200):
  a. sets request-URI to the identity of the VAL server (100);
  b. includes the accept-contact header field with the media feature tag g.3gpp.icsi-ref set to the value "urn:urn-7:3gpp-service.ims.icsi.seal" along with parameters "require" and "explicit" in accordance with IETF RFC 3841;
  c. includes the delete location event subscribe response message as specified in the FIGS. 2CA and 2CB, in an application/vnd.3gpp.location-event MIME body. In delete location event subscribe response message, the SLM-S (200):
    i. sets the subscription identifier IE to the unique subscription identifier which is assigned to the subscription request,
  d. Sends the SIP message request towards the VAL server (100) according to 3GPP TS 24.229;
  e. Stops TLM-1 (subscription expiry) timer if it is running; and
  f. Stops TLM-2 (notification interval) timer if it is running. In an embodiment, the SIP MESSAGE request towards the VAL server (100) may include the subscription identifier and other required parameters (e.g., XML or any other data format).

At 510b, upon receiving the SIP message with the application/vnd.3gpp.location-event MIME body containing the delete location event subscribe response message, the VAL server (100):
  a. deletes the subscription related data; and
  b. stops timer TLM-3 (subscription refresh) timer.

Figure 6A:
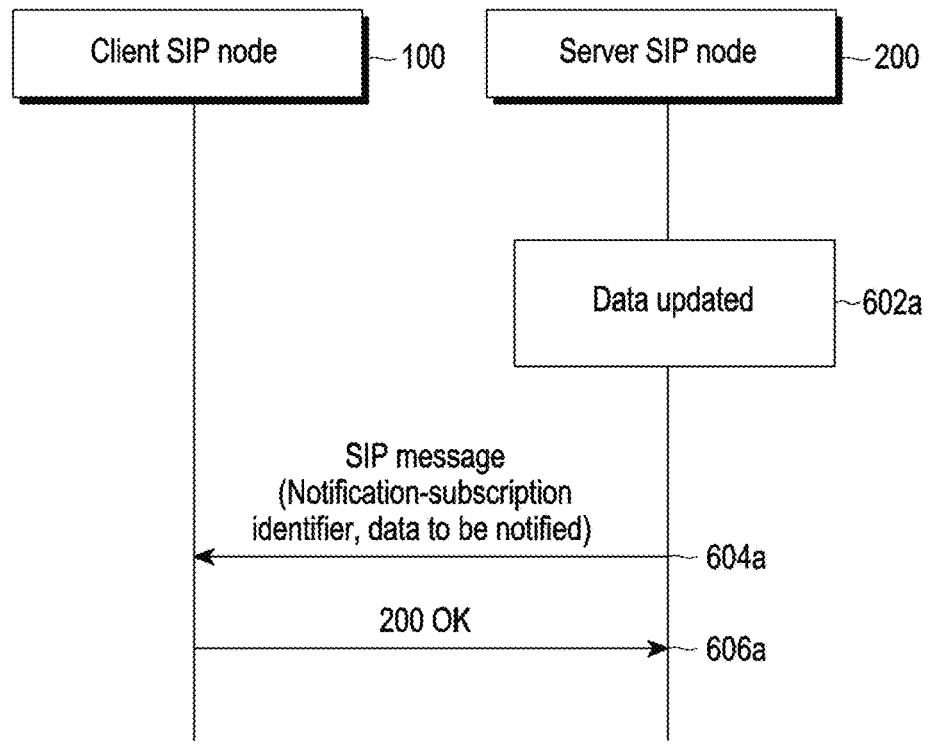
FIG. 6A is a sequence diagram illustrating various operations for sending notification for the custom subscription over the SIP, according to an embodiment as disclosed herein.

FIG. 6A is a sequence diagram illustrating various operations for sending notification for the custom subscription over the SIP, according to an embodiment as disclosed herein.

At 602a-604a, if the notification interval timer is not running, the server SIP node (200) generates the SIP message according the 3GPP TS 24.229 and IETF RFC 3428. The SIP message includes the notification containing at least the subscription identifier, and the notification data. The server SIP node (200) sends the SIP message towards the client SIP node (100). At 606a, the client SIP node (100) sends the SIP 200 (OK) response towards the server SIP node (200). The client SIP node (100) stores the data received in the notification and may present it to user or share it further to other users. The server SIP node (200) starts the notification interval timer.

Figure 6B:
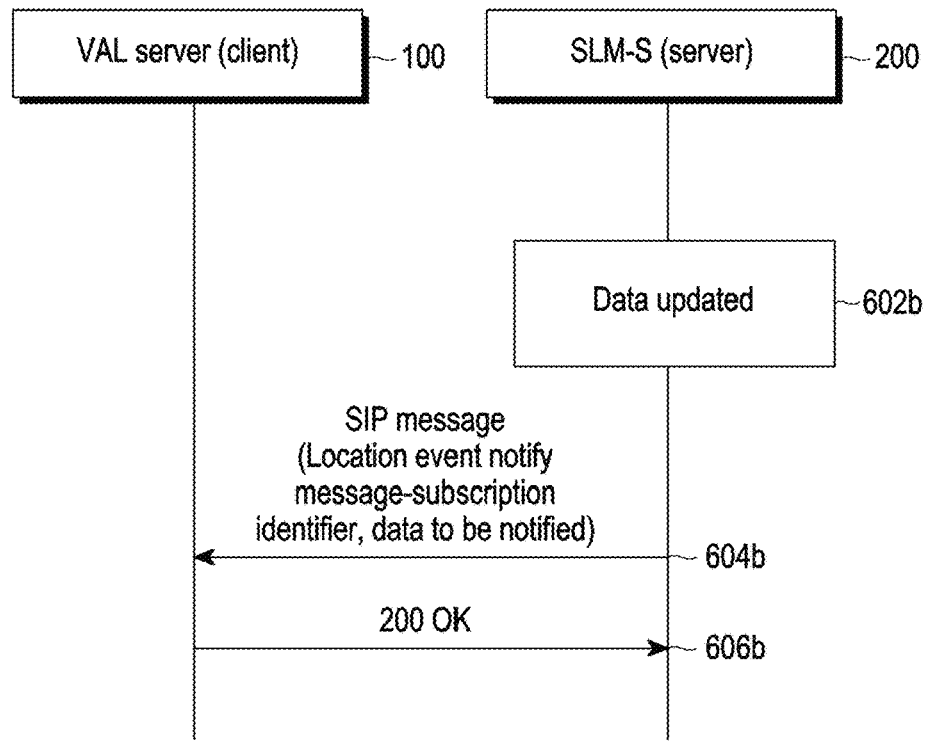
FIG. 6B is a sequence diagram illustrating various operations for sending notification for the custom subscription over the SIP for the location information according to an embodiment as disclosed herein.

FIG. 6B is a sequence diagram illustrating various operations for sending notification for the custom subscription over the SIP for the location information, according to an embodiment as disclosed herein.

At 602b-604b, in order to notify the VAL server (100) about the location information report, the SLM-S (200):
  a. if the TLM-2 (notification interval) timer is running, may skip the rest of the steps;
  b. Generates the SIP MESSAGE request according to 3GPP TS 24.229 and IETF RFC 6086;
  c. Sets request-URI to the identity of the VAL server (100);
  d. Includes the accept-contact header field with the media feature tag g.3gpp.icsi-ref set to the value "urn:urn-7:3gpp-service.ims.icsi.seal" along with parameters "require" and "explicit" in accordance with IETF RFC 3841;
  e. Includes in the SIP IVIES SAGE request, the location event notify message as specified in the FIGS. 2CA and 2CB, in an application/vnd.3gpp.location-event MIME body; In the location event notify message, the SLM-S (200):
    i. sets the subscription identifier IE to the subscription identifier value which uniquely identifies the subscription,
    ii. sets the number of user IE to the total number of VAL users for which location information is included in the message, and
    iii. for each VAL user include user location data IE containing VAL user number associated with the VAL user ID and the location information data;
  f. sends the SIP MESSAGE request towards the VAL server (100) according to 3GPP TS 24.229;
  g. starts the TLM-2 (notification interval) timer and set the expiry time of the timer to the time interval value. In an embodiment, the SIP MESSAGE request towards the VAL server (100) may include the subscription identifier, a number of users, location data for each user and other required parameters (e.g., XML or any other data format).

At 606b, upon receiving the SIP MESSAGE with the application/vnd.3gpp.location-event MIME body containing location event notify message, the VAL server (100):
  a. stores the received location information; and
  b. may share the information to a group or to another VAL user or VAL UE.

Figure 7A:
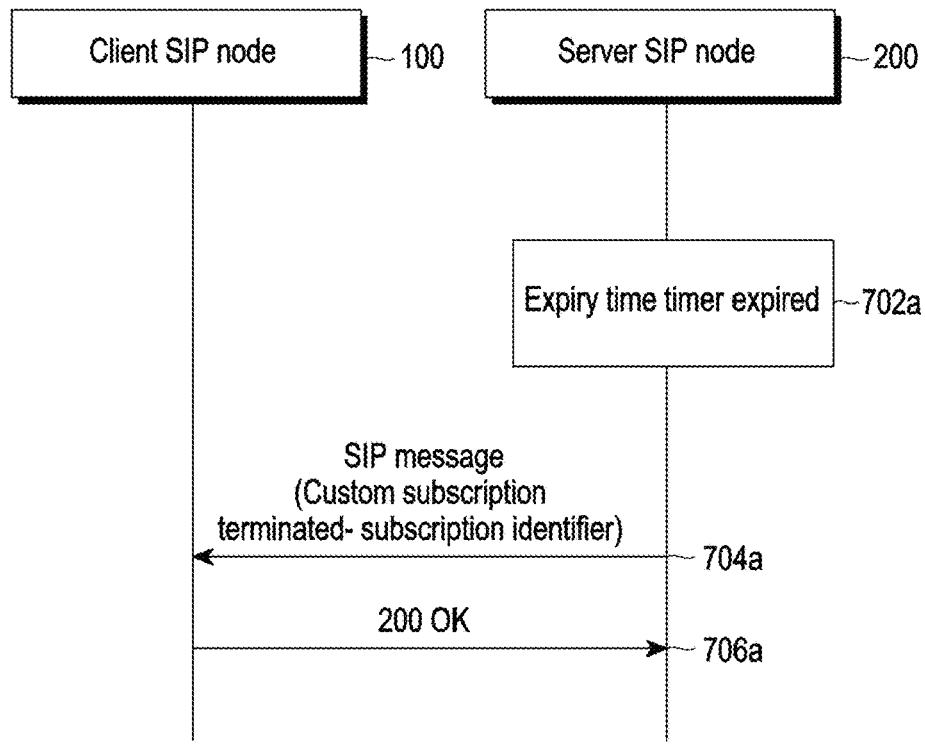
FIG. 7A is a sequence diagram illustrating various operations for terminating the custom subscription over the SIP, according to an embodiment as disclosed herein.

FIG. 7A is a sequence diagram illustrating various operations for terminating the custom subscription over the SIP, according to an embodiment as disclosed herein.

At 702a-704a, the server SIP node (200) generates the SIP message according the 3GPP TS 24.229 and IETF RFC 3428. The SIP message includes the custom subscription terminated message containing at least the subscription identifier. The server SIP node (200) sends the SIP message towards the client SIP node (100). At 706a, the client SIP node (100) sends the SIP 200 (OK) response towards the server SIP node (200). The client SIP node (100) deletes the subscription related data and also deletes all timers.

Figure 7B:
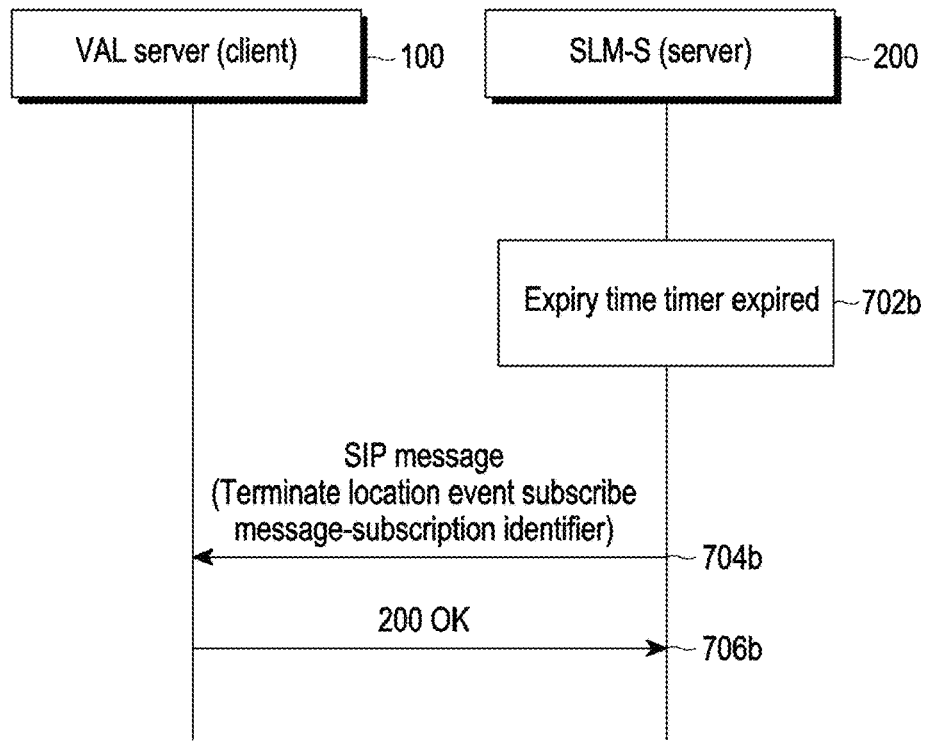
FIG. 7B is a sequence diagram illustrating various operations for terminating the custom subscription over the SIP for the location information according to an embodiment as disclosed herein.

FIG. 7B is a sequence diagram illustrating various operations for terminating the custom subscription over the SIP for the location information, according to an embodiment as disclosed herein.

At 702b-704b, in order to notify the VAL server (100) about the termination of the subscription, the SLM-S (200):
  a. generates the SIP MESSAGE request according to 3GPP TS 24.229 and IETF RFC 6086;
  b. sets request-URI to the identity of the VAL server (100);
  c. includes the Accept-Contact header field with the media feature tag g.3gpp.icsi-ref set to the value "urn:urn-7:3gpp-service.ims.icsi.seal" along with parameters "require" and "explicit" in accordance with IETF RFC 3841;

d. includes in the SIP MESSAGE request, the terminate location event subscribe message as specified in FIGS. 2CA and 2CB, in the application/vnd.3gpp.location-event MIME body; In the terminate location event subscribe message, the SLM-S (200):

i. sets the subscription identifier IE to the subscription identifier value which uniquely identifies the subscription;

e. sends the SIP message request towards the VAL server (100) according to 3GPP TS 24.229. In an embodiment, the SIP MESSAGE request towards the VAL server (100) may include the subscription identifier and other required parameters as (e.g., XML or any other data format).

At 706*b*, upon receiving the SIP message with the application/vnd.3gpp.location-event MIME body containing the terminate location event subscribe message, the VAL server (100):

a. deletes the subscription related data; and
b. stops the timer TLM-3 (subscription refresh) timer.

The embodiments disclosed herein can be implemented using at least one hardware device and performing network management functions to control the elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a service enabler architecture layer (SEAL) location management server (SLM-S) for managing a subscription over a session initiation protocol (SIP), the method comprising:
    receiving, from a vertical application layer (VAL) server, a first SIP message requesting a creation of the subscription to subscribe location information over the SIP;
    transmitting, to the VAL server, a response message in response to receiving the first SIP message;
    generating subscription identifier (ID) information specifying a unique subscription ID for identifying the subscription; and
    transmitting, to the VAL server, a second SIP message including the subscription ID information, and
    wherein the first SIP message comprises expiry time information specifying an expiry time for the subscription and time interval information specifying a time between two consecutive notifications for the subscription, the expiry time information being associated with a subscription expiry timer of the SLM-S and the time interval information being associated with a notification interval timer of the SLM-S.

2. The method as claimed in claim 1, wherein the first SIP message further comprises user ID information including ID of at least one VAL user whose the location information is requested.

3. The method as claimed in claim 2, further comprising:
    sending, to the VAL server, a fifth SIP message to notify the location information, wherein the fifth SIP message comprises the subscription ID information and data to be notified.

4. The method as claimed in claim 3, wherein the VAL server stores the data in the fifth SIP message and shares the data with the at least one VAL user.

5. The method as claimed in claim 1, wherein the second SIP message further comprises information specifying an accepted expiry time.

6. The method as claimed in claim 1, further comprising:
    re-configuring an expiry time for the subscription in case that a value of the expiry time information included in the first SIP message is not acceptable by the SLM-S; and
    initiating the subscription expiry timer and setting an expiry time of the subscription expiry timer to a value of a re-configured expiry time.

7. The method as claimed in claim 1, further comprising:
    receiving, from the VAL server, a third SIP message requesting a deletion of the subscription over the SIP, wherein the third SIP message comprises the subscription ID information and the expiry time that is set to a value of zero;
    sending, to the VAL server, a response message in response to receiving the third SIP message;
    deleting at least one parameter associated with the subscription; and
    sending, to the VAL server, a fourth SIP message and disabling a subscription expiry timer and a notification interval timer, wherein the fourth SIP message comprises the subscription ID information.

8. A service enabler architecture layer (SEAL) location management server (SLM-S) for managing a subscription over a session initiation protocol (SIP), the SLM-S comprising:
    memory;
    a processor operably connected to the memory, the processor configured to:
        receive, from a vertical application layer (VAL) server, a first SIP message requesting a creation of the subscription to subscribe location information over the SIP;
        transmit, to the VAL server, a response message in response to receiving the first SIP message;
        generate subscription identifier (ID) information specifying a unique subscription ID for identifying the subscription; and
        transmit, to the VAL server, a second SIP message including the subscription ID information, and
    wherein the first SIP message comprises expiry time information specifying an expiry time for the subscription and time interval information specifying a time between two consecutive notifications for the subscription, the expiry time information being associated with a subscription expiry timer of the SLM-S and the time interval information being associated with a notification interval timer of the SLM-S.

9. The SLM-S as claimed in claim 8, wherein the first SIP message further comprises user ID information including ID of at least one VAL user whose the location information is requested.

10. The SLM-S as claimed in claim 8, wherein the second SIP message further comprises information specifying an accepted expiry time.

11. The SLM-S as claimed in claim 8, wherein the processor is further configured to:
    re-configure an expiry time for the subscription in case that a value of the expiry time information included in the first SIP message is not acceptable by the SLM-S; and
    initiate the subscription expiry timer and setting an expiry time of the subscription expiry timer to a value of a re-configured expiry time.

12. The SLM-S as claimed in claim 8, wherein the processor is further configured to:
- receive, from the VAL server, a third SIP message requesting a deletion of the subscription over the SIP for specific information, wherein the third SIP message comprises the subscription ID information and the expiry time that is set to a value of zero;
- send, to the VAL server, a response message in response to receiving the third SIP message;
- delete at least one parameter associated with the subscription; and
- send, to the VAL server, a fourth SIP message and disabling a subscription expiry timer and a notification interval timer, wherein the fourth SIP message comprises the subscription ID information.

13. The SLM-S as claimed in claim 8, wherein the processor is further configured to:
- send, to the VAL server, a fifth SIP message to notify the location information, wherein the fifth SIP message comprises the subscription ID information and data to be notified.

14. The SLM-S as claimed in claim 13, wherein the VAL server stores the data in the fifth SIP message and shares the data with at least one VAL user.

15. A vertical application layer (VAL) server for managing a subscription over a session initiation protocol (SIP), the VAL server comprising:
- memory;
- a processor operably connected to the memory, the processor configured to:
  - transmit, to a service enabler architecture layer (SEAL) location management server (SLM-S), a first SIP message requesting a creation of the subscription to subscribe location information over the SIP;
  - receive, from the SLM-S, a response message in response to the first SIP message; and
  - receive, from the SLM-S, a second SIP message including subscription identifier (ID) information specifying a unique subscription ID for identifying the subscription, and
- wherein the first SIP message comprises expiry time information specifying an expiry time for the subscription and time interval information specifying a time between two consecutive notifications for the subscription, the expiry time information being associated with a subscription expiry timer of the SLM-S and the time interval information being associated with a notification interval timer of the SLM-S.

16. The VAL server as claimed in claim 15, wherein the first SIP message further comprises user ID information including ID of at least one VAL user whose the location information is requested.

* * * * *